Oct. 23, 1951   S. M. HIBBARD   2,572,262
MACHINE AND METHOD FOR ROUNDING FOOD PRODUCTS
Filed Oct. 10, 1946
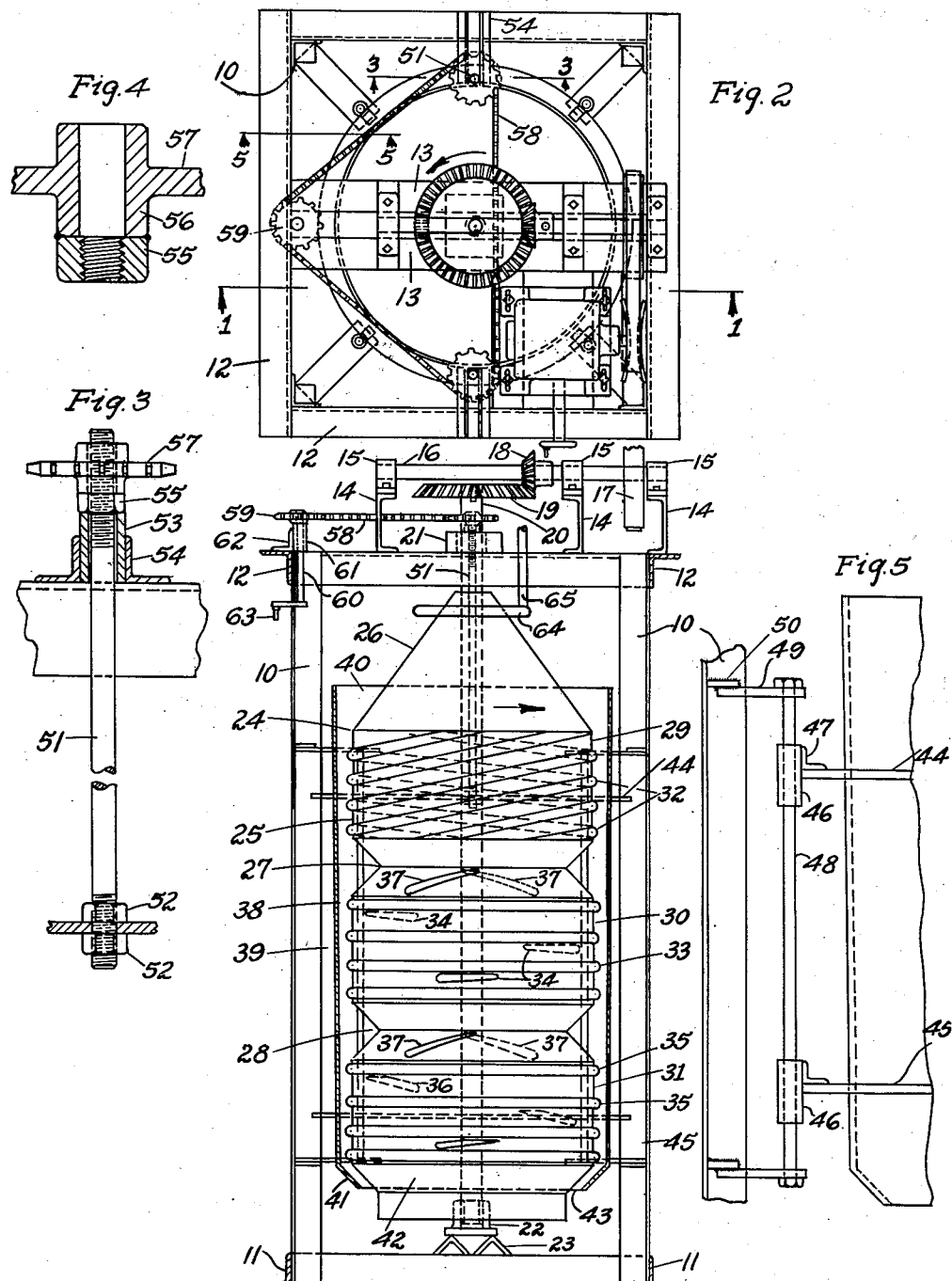
INVENTOR.
SCHUYLER M. HIBBARD
BY Edward H. Cumpston
HIS ATTORNEY Patented Oct. 23, 1951

2,572,262

UNITED STATES PATENT OFFICE 2,572,262

MACHINE AND METHOD FOR ROUNDING FOOD PRODUCTS

Schuyler M. Hibbard, Macedon, N. Y., assignor to Canning Machinery, Inc., Rochester, N. Y., a corporation of New York Application October 10, 1946, Serial No. 702,457

4 Claims. (Cl. 146—226)

1

This invention relates to machines for rounding food products and has for one of its objects the provision of a simple, practical and reliable machine for grinding products such as pieces cut from the meaty portions of vegetables, fruits, and the like, to convert them into pieces of round or ball shape of new and attractive appearance.

Another object is to provide a convenient and self-contained machine of the above character having a type of construction capable of being readily adjusted to produce completed products of predetermined size.

A further object is to supply such a machine having a simple construction adapted to be readily machined and assembled at relatively low cost.

To these and other ends the invention resides in certain improvements and combinations of parts, all as will be hereinafter more fully described, the novel features being pointed out in the claims at the end of the specification.

In the drawings:

Fig. 1 is a sectional elevation substantially on the line 1—1 in Fig. 2, showing a machine embodying the present invention;

Fig. 2 is a top plan view of the same;

Fig. 3 is an enlarged view, partly in section and partly broken away, substantially on the line 3—3 in Fig. 2;

Fig. 4 is a fragmentary, enlarged, sectional view of parts shown in Fig. 3, and

Fig. 5 is a fragmentary, enlarged elevation of a guide means shown in Fig. 1.

The embodiment of the invention herein disclosed, by way of illustration, comprises, preferably, a supporting frame composed of four vertical corner posts made of angle iron bars 10 connected at their base by angle iron bars 11 welded or otherwise secured thereto. The tops of the posts 10 are connected by similar angle iron bars 12 welded or otherwise suitably fixed thereto. A pair of spaced, angle iron beams 13 are fixed at their ends to central portions of opposite bars 12, so as to extend across the top of the frame and provide a platform for the driving mechanism.

To support the driving mechanism, short bars 14 of I-beam section are fixed to the bars 13 and carry bearings 15 for a rotating shaft 16 driven by a belt pulley 17. Fixed on the shaft is a bevel pinion 18 meshing with a bevel gear 19 fixed on the top of a vertical shaft 20. Shaft 20 is rotatably supported at its top in a bearing 21 fixed on the beams 13 and at its bottom in a step bear-

2 ing 22 supported on angle iron bars 23 fixed at their ends to opposite bars 11 at the base of the frame.

Shaft 20 supports and drives a grinding drum means indicated generally at 24 preferably tapered at either end and comprising a cylindrical wall 25 closed at its top by a receiving or "spreader" cone 26. The drum is concentrically fixed by interior bracket means (not shown) to the shaft 20 so as to rotate with the shaft. Its cylindrical wall is preferably recessed or indented at spaced points, as at 27 and 28, so as to divide it equally into upper, middle and lower portions 29, 30, and 31 having ribbed surfaces as hereafter described. Indentations 27 and 28 form two parallel grooves at right angles to the shaft and having inclined walls.

The upper drum portion 29 is provided with a series of spaced ribs 32 formed by strips of half round material fixed thereto in spaced parallel relation and extending spirally thereabout at a relatively low angle with the horizontal, as shown.

The middle drum portion 30 is provided with similar ribs 33 each of which, however, preferably extends in a circumferential direction thereabout in a plane perpendicular to the longitudinal axis or shaft 20 of the drum means. A number of short rib strips 34 are preferably fixed intermediately to this drum portion between the ribs 33, these short strips being tapered from end to end and arranged with their lower sides inclined to the horizontal, as shown, for a purpose hereafter described.

The lower drum portion 31 is provided with horizontal ribs 35, similar to the ribs of the drum portion 30, and this drum portion also is provided with short rib strips 36, similar to the ribs 34. The circumferential ribs 33 of the intermediate drum portion are preferably spaced at a somewhat greater distance from each other than the spiral ribs 32 of the uppermost drum portion and the ribs 35 of the lowermost drum portion 31 are preferably spaced from each other at a greater distance than those of the intermediate drum portion, as shown. The short rib strips 36 of the lower drum are preferably inclined at a somewhat steeper angle to the horizontal than the ribs 34 of the intermediate drum. The lower walls of the recessed portions 27 and 28 of the drum means are each provided with short rib strips 37 having a spiral inclination for a purpose hereafter described. The surfaces of the drum portions and their ribs are roughened as by the application thereto of an enamel containing particles of sand or other gritty material adapted to provide an effective abrasive or grinding surface, as well understood in the art.

Coacting with the above grinding drum means is a grinding sleeve or cylinder 38, of generally larger diameter than the drum means, and concentrically surrounding the latter in spaced relation therewith. The sleeve, which is stationarily supported by means hereafter described, is provided with an inner surface of the abrasive or grinding character described above in connection with the drum surfaces and is tapered inwardly from top to bottom, to produce between it and the drum a grinding space or chamber 39 of gradually decreasing width from top to bottom. Preferably the surfaces of the drum and sleeve are coated with abrasive material. However, the machine will operate satisfactorily if either one of the surfaces is abrasive and the other not. The sleeve has an open upper end 40 and its lower end is contracted inwardly as at 41, in spaced relation with the contracted lower end 42 of the drum means, leaving a discharge outlet 43 for the products.

Means are provided for guiding sleeve 38 in its vertical adjustment on the frame comprising, preferably, a pair of upper and lower flanges 44 and 45, respectively, Fig. 5, to each of which a sleeve 46 is fixed opposite each corner of the frame, as by means of an angle iron 47. The vertically alined sleeves 46 at each corner are arranged to slide vertically on a guide rod 43 supported at its ends by the inner end of a bar 49 having its outer end welded to a plate 50 welded between the sides of the angle iron bar forming the corner post 10.

The means for supporting and adjusting the sleeve 38 comprises also a pair of suspension rods 51, Figs. 1, 2, and 3, one on each side of the sleeve and each having its lower end fixed through an opening in the upper flange 44 of the sleeve by opposing nuts 52. The upper end of each rod passes loosely through a guide sleeve 53 supported by a pair of spaced angle iron bars 54 welded to the top bars of the frame. The upper end of each rod 51 has threaded thereon a nut 55 resting on the upper end of sleeve 53. The nut is welded to the lower end of a hub 56, Fig. 4, of a sprockets wheel 57 turning loosely on the rod. Sprockets 57 at opposite sides of the machine are connected by a sprocket chain 58, Fig. 2, which passes also around a sprocket wheel 59 fixed on the upper end of a short shaft 60 turning loosely in a bearing sleeve 61 supported on the top of the frame as by means of an angle 62 welded thereto and to the frame. The lower end of shaft 60 carries a hand crank 63 for driving the sprocket chain and thereby simultaneously rotating each of the rods 51 through an equal angle to raise or lower the sleeve relative to the drum means to vary the width of the grinding space.

The products to be ground are supplied to the spreader cone 26, as by means of any suitable hopper or conveyor (not shown), as well understood in the art, and means are provided for supplying to the spreader cone also a flow of water, such as a perforated spray head or ring 64 supplied through a pipe 65 suitably supported on the top of the frame.

It is evident from the above construction that with the drum means in rotation, and the sleeve 28 adjusted vertically by rotation of the crank 63, so as to lie at a desired distance from the surface of the drum means, the meats of fruits, vegetables, and the like, cut up or "diced" to produce pieces of approximately cubicle shape, may be fed in that condition to the spreader cone 26, so as to fall into the top of the grinding space between it and the sleeve 28, accompanied by a supply of washing water from the ring 64. The drum means being rotated in a counterclockwise direction as viewed from above, or, in other words, rotated in the ascending direction of the spiral ribs, such angularly shaped pieces or products fall into the grinding or abrading chamber and into the spaces between the grinding ribs by which they are carried downwardly in rolling and shifting grinding contact with the surfaces of the drum means and sleeve 38, by gravity and the ribs. As the pieces descend their irregular projections or corners are progressively removed by tumbling and abrading. The products are eventually discharged into the upper recess 27 where they are momentarily spread out and rearranged in position, then falling or being pressed downwardly by the short ribs 37 past the circumferential ribs 33 of the intermediate drum portion between which and the sleeve the tumbling and abrading process is continued as the pieces assume more rounded form within the converging walls of the sleeve. The downward movement past this drum portion is maintained by the tapered lower surfaces of the short ribs 34 lying between the ribs 33. The products then fall into the lower recessed portion 28 of the drum where they are again momentarily spread out and rearranged in position. From this recess the pieces fall, or are pressed by the inclined ribs 37, between the lower drum portion 31 and the sleeve where the tumbling and abrading process is continued. As the pieces are converted to rounded shape and smaller size, they are maintained in contact with the brading surfaces by the decreasing width of the grinding chamber, although the intensity of the grinding action is progressively reduced by the circumferential direction and greater spacing of the ribs in the intermediate and lower drum zones.

By such tumbling and abrading treatment the products are effectively converted to a round or ball shape and drop out of the grinding chamber at the lower end 43 of the sleeve into any suitable draining receptacle or discharge trough (not shown), the waste material produced by the grinding being carried away and discharged by the wash water. By adjusting vertically the position of the sleeve 38, the machine may be adapted for treatment of different kinds of materials, or to produce products of the same material but of different sizes. The parts of the machine are relatively few in number and simple in construction, consisting largely of commercially available standard parts fastened together in most instances by a simple welding operation, so that the machine as a whole may be readily manufactured at a relatively low cost.

It will thus be seen that the invention accomplishes its objects, and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A machine for rounding angularly shaped pieces of food comprising a supporting frame, a driving mechanism supported by said frame, a shaft driven by said mechanism, a drum carried by the shaft and rotated by it, said drum having tapered ends and a main body divided into upper, middle and lower portions by indentations to form two parallel grooves having upper and lower walls, a first series of ribs extending spirally around the upper portion, a second and third series of parallel ribs extending around the middle and lower portions respectively, first tapered strips fastened to the middle portion of the drum, second tapered strips on the lower portion of the drum, third strips fastened to the lower wall of the grooves, a cylinder having inclined walls open at both ends surrounding the drum, said drum and cylinder being spaced to form an annular chamber between them, means for supporting said cylinder on said frame, means for adjusting the position of the cylinder to vary the width of the chamber, a coating of abrasive substance on the surface of the drum, ribs, strips and inner surface of the cylinder.

2. A machine for rounding cube-shaped pieces of food comprising a supporting frame, a driving mechanism supported by said frame, a vertical shaft driven by said mechanism, a vertical drum carried by the shaft and rotated by it, said drum having tapered ends and a main body divided into upper, middle and lower portions by indentations to form two parallel grooves at right angles to the shaft and having inclined walls, a first series of ribs extending spirally around the upper portion, a second and third series of parallel ribs extending around the middle and lower portions, respectively, of the drum at right angles to the shaft, the third ribs being spaced further apart than the second, first tapered strips shorter than the second ribs fastened to the middle portion of the drum between said second ribs and inclined at an angle to a horizontal plane passing through the second ribs, second tapered strips on the lower portion of the drum inclined to a horizontal plane passing through the third ribs more steeply than the first strips to the second ribs, third strips spirally fastened to the lower inclined walls of the grooves, a cylinder open at both ends surrounding the drum from a point above the widest part of the upper portion to the narrowest part of the lower tapered end of the drum, said drum and cylinder being spaced to form a chamber of gradually diminishing width from top to bottom, means for supporting said cylinder on said frame, means for vertically adjusting the position of the cylinder to vary the width of the chamber, a coating of abrasive substance on the surface of the drum, ribs, strips and inner surface of the cylinder, and an inlet for flushing water surrounding the upper tapered end of the drum.

3. A machine for rounding angularly shaped pieces of food comprising a rotatable drum having tapered ends and upper and lower indentations between the ends to divide it into upper, middle and lower portions, said indentations of sufficient size to allow the pieces of food freedom of movement, a first series of abrasive ribs of semi-circular cross-section extending spirally around the upper portion for abrading the pieces of food while moving them downwardly, a second and third series of parallel abrasive ribs of semi-circular cross-section extending around the middle and lower portions respectively for abrading the pieces of food while permitting them to move downwardly, first and second tapered strips fastened to the upper and lower indentations respectively, said strips acting to rearrange, tumble and rotate the food pieces, a cylinder having inclined walls open at both ends surrounding the drum, said drum and cylinder being spaced to form an annular chamber to permit the food pieces to move downwardly, and snugly therebetween, and means for adjusting the position of the cylinder to vary the width of the chamber.

4. The method of forming substantial spheres from cubically shaped pieces of solid food such as beets comprising the steps of subjecting the pieces to a first stage of tumbling, rotating and abrading operations while moving the pieces downwardly, releasing said pieces and rearranging them, subjecting said released pieces to a second stage of tumbling, rotating and abrading operation while moving downwardly wherein the abrading operation is of a finer type than the first abrading operation, releasing said pieces, agitating them and finally subjecting them to a final tumbling, rotating and abrading operation to produce relatively smooth substantial spheres.

SCHUYLER M. HIBBARD.

REFERENCES CITED

The following references are of record in the file of this patent:

UNITED STATES PATENTS

| Number | Name | Date |
|---|---|---|
| 10,796 | Fairchild et al. | Apr. 18, 1854 |
| 79,970 | Gibson | July 14, 1868 |
| 224,406 | Duhem | Feb. 10, 1880 |
| 632,637 | Brooker | Sept. 5, 1899 |
| 758,565 | Shier | Apr. 26, 1904 |
| 999,478 | Archer | Aug. 1, 1911 |
| 1,017,326 | Schacht | Feb. 13, 1912 |
| 1,168,133 | Welch | Jan. 11, 1916 |
| 1,647,249 | Padszus | Nov. 1, 1927 |
| 2,072,598 | Kile | Mar. 2, 1937 |
| 2,090,455 | Meinzer | Aug. 17, 1937 |
| 2,138,716 | Truitt | Nov. 29, 1938 |
| 2,206,748 | Moore | July 2, 1940 |
| 2,340,313 | Earle | Feb. 1, 1944 |
| 2,400,292 | Dalton | May 14, 1946 |
| 2,433,730 | Bridge | Dec. 30, 1947 |